Nov. 25, 1947.                J. FOLK                    2,431,390
       DETACHABLE SUBSTANCE SUPPORT FOR RECIPROCATING
                CARRIAGE TYPE SLICING MACHINES
               Filed Aug. 30, 1943         2 Sheets-Sheet 1
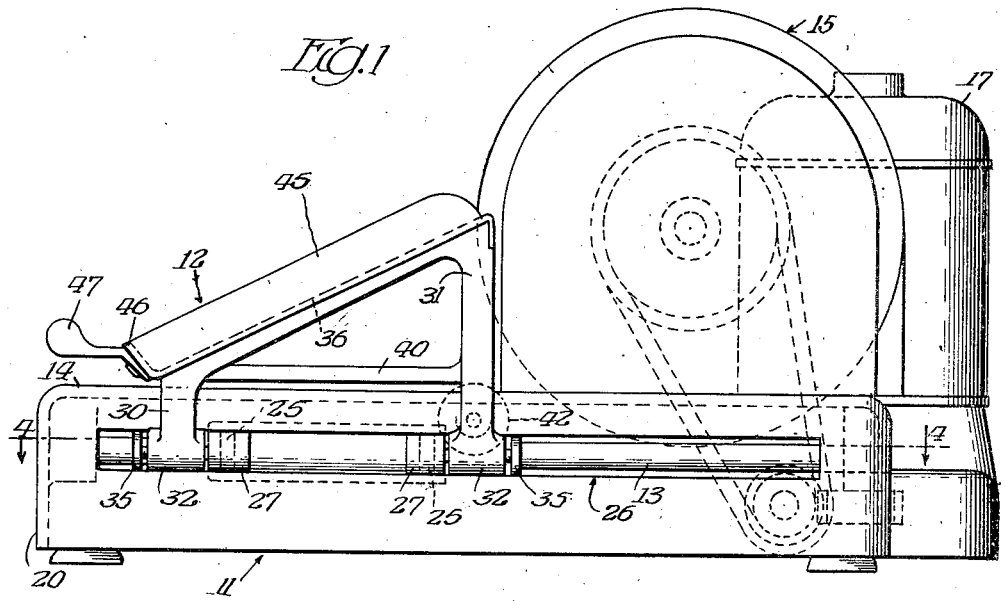
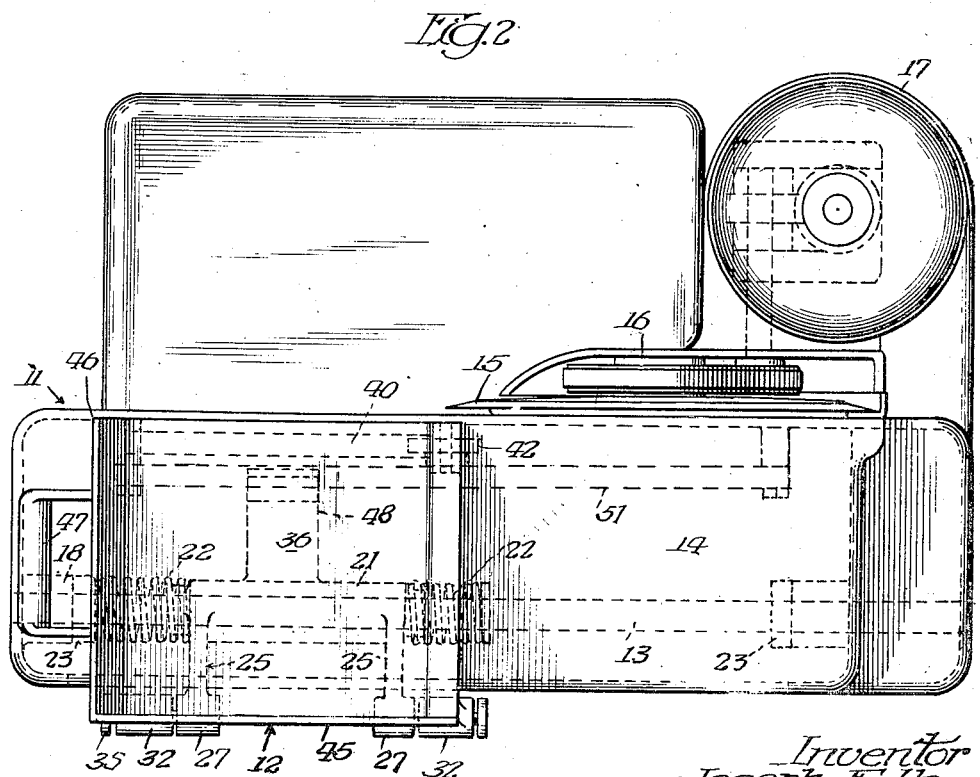
Inventor
Joseph Folk
By Spencer, Marzall, Johnston & Cook
Attys

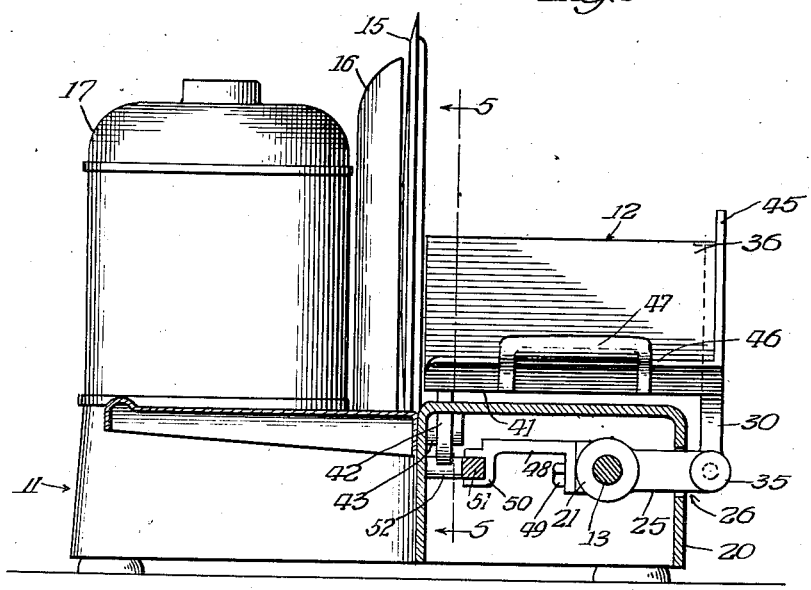
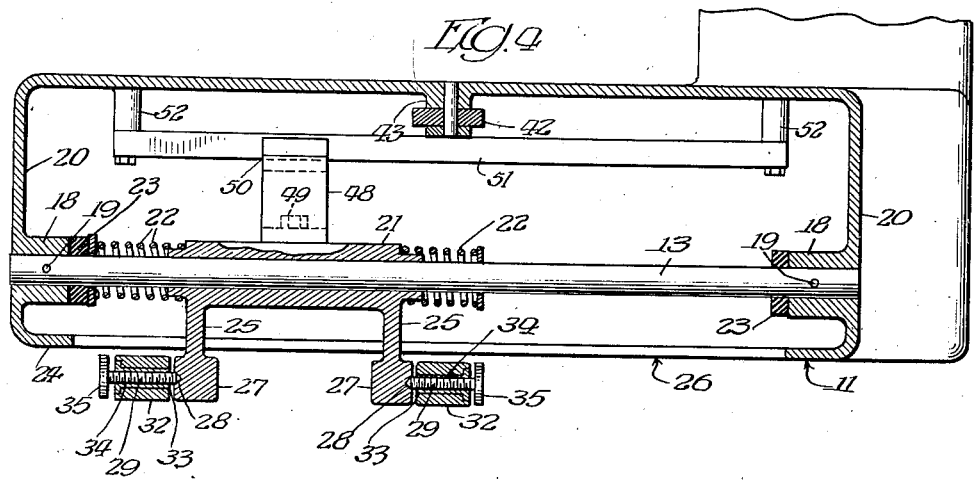
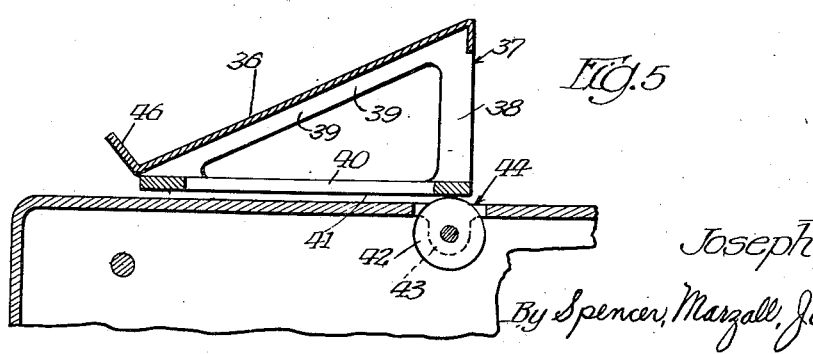

Patented Nov. 25, 1947

2,431,390

UNITED STATES PATENT OFFICE 2,431,390

DETACHABLE SUBSTANCE SUPPORT FOR RECIPROCATING CARRIAGE TYPE SLICING MACHINES

Joseph Folk, La Porte, Ind., assignor to U. S. Slicing Machine Company, La Porte, Ind., a corporation of Indiana Application August 30, 1943, Serial No. 500,520

1 Claim. (Cl. 146—102)

1

This invention relates to slicing machines employing a rotary slicing knife and particularly to means for supporting substance to be fed to the slicing knife. More specifically the invention relates to a substance support which is so mounted for reciprocation to and from the slicing knife that the substance support may not only be pivoted about one of its edges to clear underlying portions of the machine but may be removed entirely to enable the slicing of substance of greater size than that which the substance support is designed to accommodate.

An object of the present invention is to provide a simple, efficient and economical mounting for a substance support in which the substance support is pivotally and slidably mounted along one side thereof and is arranged for movement in relation to a rest or guide along its opposite side so that it can be freely reciprocated to and from the slicing knife and also, when not in operation, readily tilted about its pivotal mounting to afford easy access to the underlying portions of the machine.

A further object of the invention is to provide a readily detachable pivotal mounting for a substance support along one side thereof so that it may be conveniently and quickly removed from the machine to enable the slicing of substance of a size greater than that which the substance support is designed to accommodate.

Additional objects, advantages and capabilities inherent in this invention will become readily apparent from the description thereof which follows.

This invention further resides in the combination, construction and arrangement of parts illustrated in the accompanying drawings, and while there is shown therein preferred embodiments of the invention, it is to be understood that the same are susceptible of modification and change without departing from the spirit of the invention.

The accompanying drawings illustrate a selected embodiment of the invention, and the views therein are as follows:

Fig. 1 is a side elevational view of a device embodying the invention;

Fig. 2 is a plan view of the device shown in Fig. 1;

Fig. 3 is a front elevational view partially in section, of the device shown in Fig. 1;

Fig. 4 is a horizontal sectional view along the line 4—4 of Fig. 1; and

Fig. 5 is a partial sectional view along the line 5—5 of Fig. 3.

2

The particular slicing machine herein shown for the purpose of illustrating the invention comprises a base 11, over which a substance support 12 is adapted to be reciprocated in a rectilinear path. The substance support 12 is supported for movement on a fixed guide 13 preferably mounted below the upper surface 14 of the base 11. A stationary, rotatably mounted knife 15 is carried by a knife supporting bracket 16 which is secured to the base 11. The knife is operatively connected with a motor housed in the motor casing 17. A gauge plate (not shown) may be mounted to the left of the knife 15 (Fig. 2) in a plane parallel to the vertical plane of the knife and arranged for adjustment laterally to provide for slicing the substance into slices of various thicknesses. The gauge plate and the manner in which it is operated or controlled are well known in the art and will not, therefore, be further described.

The substance support, as shown, is arranged for manual reciprocation to convey substance to be cut into cutting engagement with the knife and away therefrom. To provide a durable, light weight, readily operable, portable machine suitable for a wide range of use, the substance support is mounted so that it not only may be pivoted about one of its edges to clear the top of the base so that it can be quickly cleaned but may be easily detached to make the machine available for the cutting of pieces of substance exceeding the capacity of the substance support. To this end the substance support is slidably mounted on the fixed guide 13.

The guide 13, which as shown in Fig. 4 is in the form of a cylindrical rod or shaft, is fixedly mounted by means of pins 19 at its opposite ends in bored bosses 18 on the inner side of the wall portion 20 of the base 11. A carriage 21 for the substance support 12 is slidably mounted on the guide 13. Movement of the carriage 21 along the guide 13 may be limited by means of a coil spring 22 mounted on each end of the carriage 21 for sliding on the guide 13 and arranged to engage a bumper facing 23 of resilient material provided on the opposed faces of the bosses 18.

The carriage 21 generally is in the form of a sleeve. In order to provide for balanced sliding of the carriage 21 and to prevent rotation of it about the guide 13 the carriage 21 carries a bracket 48, which is rigidly secured to the carriage as by means of a screw 49, or may be formed integrally therewith. The end of the bracket 48 remote from the carriage has a U-shaped or yoke portion 50 which is adapted to receive a guide 51 in sliding engagement. The guide 51 is rigidly mounted upon the base 11 as by means of brackets 52 secured on the inner side of the base 11, or extending upwardly from the bottom of the base, and is arranged in parallel relation with the guide 13.

The carriage 21 is provided with spaced arms 25 which extend outwardly through a slot 26 provided in the wall portion 24 of the base 11. The arms 25 are each provided with an enlarged outer end portion 27 having a central recess 28 in one face adapted to receive an end of a threaded member 29.

The substance support 12 has spaced supporting members or brackets 30, 31, on one side thereof. Each of these brackets is provided at its lower end with an enlarged portion 32 having a longitudinally extending central bore 33 adapted rotatably and slidably to receive a sleeve or bushing 34.

Each of the bushings 34 is internally threaded to receive a threaded member 29, which is adjustable to secure the bushing to the portion 27 of the arm 25. The arrangement is such that the substance support either may be pivoted with the brackets 30, 31 about the bushings 34 and the threaded members 29 and thus swung clear of the top 14 of the base 11 or may be wholly detached from the machine by manipulating the knobs 35 of the threaded members 29 to withdraw them from engagement with the portions 27 of the arms 25.

The substance support 12, which preferably extends in the form of a truss transversely of the machine, has an inclined supporting surface 36. In order to provide a rigid substance supporting structure and avoid deflection of the substance support due to the slicing operation and consequent corrugation or irregularity of thickness of slices, counter-supporting means are provided for the substance supporting surface. To this end a supporting frame 37 is provided on the side of the substance support opposite the members 30, 31. This frame comprises a depending portion 38, an inclined portion 39 and a horizontal portion 40. The horizontal portion 40 is arranged so that its under side 41 will serve as a slide or shoe and freely slide or roll on a suitable support mounted on the base 11. This support, as shown in the drawings, may be in the form of a roller 42 rotatably mounted in a boss 43 provided in a wall portion of the base 11. A slot 44 is provided in the top of the base and the roller is arranged to extend upwardly through the slot to have rolling contact with the surface 41. The boss 43 and the roller 42 are preferably positioned so that the line of contact between the roller and the surface 41 will lie in or closely adjacent to a plane perpendicular to the slicing plane of the knife 15 and the base of the machine where the slicing of the substance begins. The roller 42 thus provides a counter-support for the substance support where most needed to prevent any deflection of the substance support due to the slicing operation.

The substance support has upwardly extending, angular flange portions 45, 46 at the outer and lower edges of the supporting surface 36. A handle 47 is provided on the flange 46 for manually reciprocating the substance support during the substance slicing operation.

The substance support may be provided with suitable means (not shown) for urging substance against the gauge plate. Such means may be in the form of a spring actuated pusher, a ratchet actuated device, or other conventional form of feeding device.

Changes may be made in the form, construction and arrangement of the parts without departing from the spirit of the invention, and the right is hereby reserved to make all such changes as fairly fall within the scope of the following claim.

The invention is hereby claimed as follows:

A slicing machine comprising a base having a top surface, a slicing knife rotatably mounted on the base, motive means operatively connected with said knife to drive the knife, a rod carried by the base below the top surface thereof, a carriage slidable on the rod, a substance support normally above the top surface of the base and adapted for to-and-fro reciprocation in a rectilinear path substantially parallel to the cutting plane of the knife to convey a substance into slicing engagement with the knife, means mounting said substance support on the carriage including arms fixed to the carriage and extending laterally from the rod beneath the top surface of the base, and means pivotally mounting the substance support on the outer ends of said arms below said top surface for swinging movement relative to the carriage to an inoperative position away from the knife and to bare the upper surface of the base, said pivotal mounting means including manually removable pivot pins detachably connecting the substance support with the arms.

JOSEPH FOLK.

REFERENCES CITED

The following references are of record in the file of this patent:

UNITED STATES PATENTS

| Number | Name | Date |
| --- | --- | --- |
| 1,902,908 | Sensow | Mar. 28, 1933 |
| 1,939,083 | Reussenzehn | Dec. 12, 1933 |
| 1,979,848 | Streckfuss | Nov. 6, 1934 |
| 2,043,850 | Folk | June 9, 1936 |
| 2,087,899 | Campbell | July 27, 1937 |
| 1,480,572 | Sivertsen | Jan. 15, 1924 |
| 1,336,799 | Vaughan | Apr. 13, 1920 |
| 2,199,267 | Meeker | Apr. 30, 1940 |
| 1,147,923 | Bond | July 27, 1915 |